United States Patent [19]

Meng

[11] Patent Number: 5,369,992
[45] Date of Patent: Dec. 6, 1994

[54] SEAWATER MAGNETOHYDRODYNAMIC TEST APPARATUS

[75] Inventor: James C. S. Meng, Portsmouth, R.I.

[73] Assignee: The United States of America as represented by the Secretary of the Navy, Washington, D.C.

[21] Appl. No.: 16,328

[22] Filed: Feb. 11, 1993

[51] Int. Cl.$^5$ .................................. G01M 10/00
[52] U.S. Cl. .................................. 73/148
[58] Field of Search .................. 73/148, 147, 168

[56] References Cited

U.S. PATENT DOCUMENTS

| | | | |
|---|---|---|---|
| 4,380,170 | 4/1983 | Dötzer et al. | 73/148 X |
| 5,273,465 | 12/1993 | Meng | 440/6 |
| 5,284,106 | 2/1994 | Meng | 114/238 |
| 5,333,444 | 8/1994 | Meng | 60/221 |

*Primary Examiner*—Thomas P. Noland
*Attorney, Agent, or Firm*—Michael J. McGowan; Prithvi C. Lall; Michael F. Oglo

[57] ABSTRACT

A magnetohydrodynamic test facility using a superconducting electromagnet to drive a hydrodynamic test loop is disclosed. The test facility has a pretreatment section for adjusting the salinity of seawater to be used in the flow loop a flow loop section having a test section, a magnetohydrodynamic pump, and a gas trap assembly to capture any gasses evolved from the seawater. A post-treatment section neutralizes evolved chlorine gasses.

11 Claims, 3 Drawing Sheets

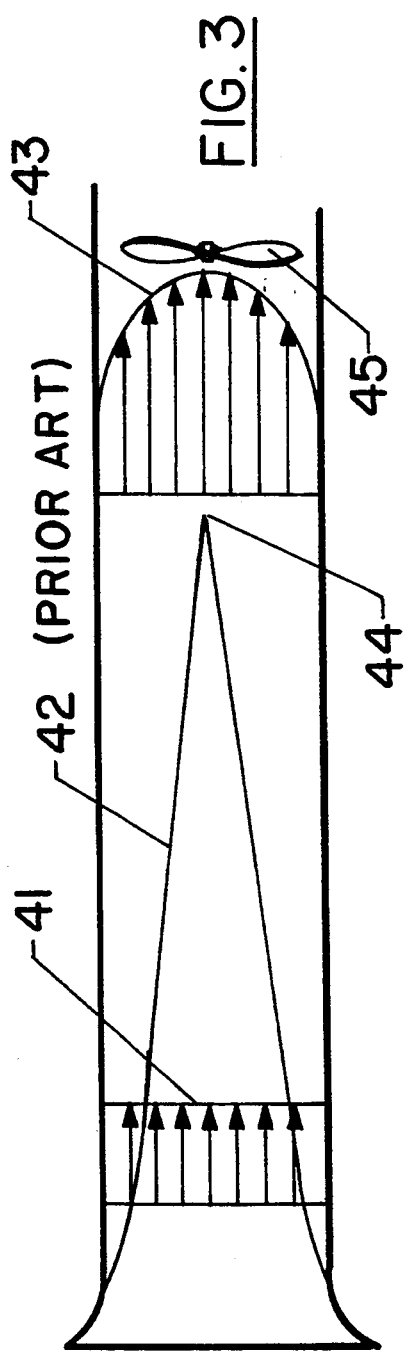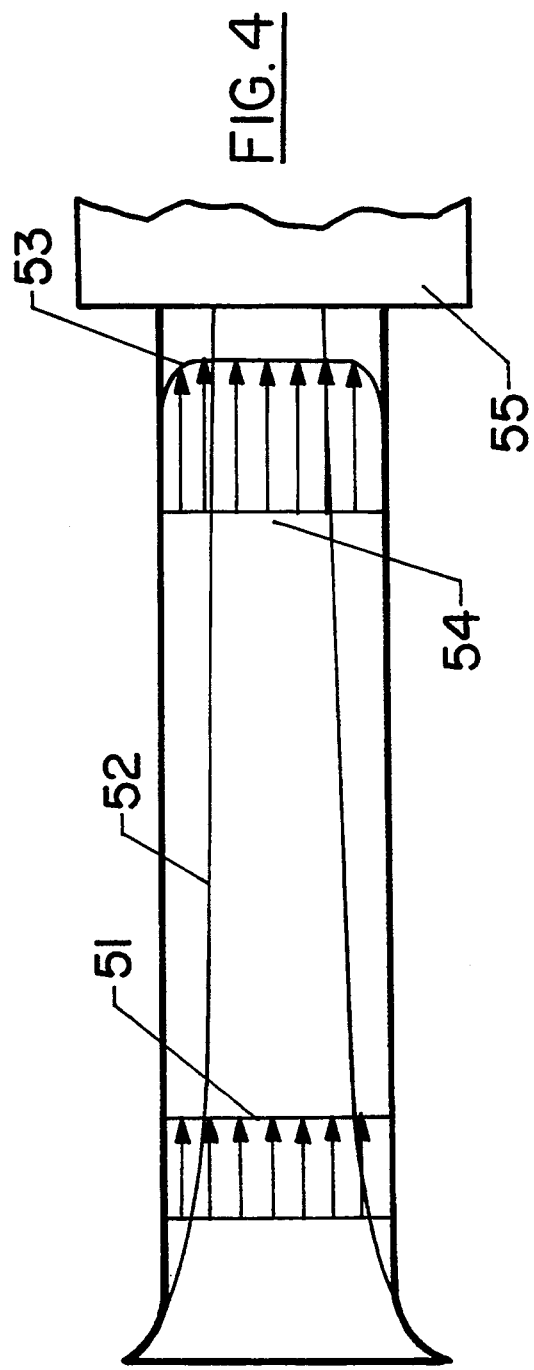

SEAWATER MAGNETOHYDRODYNAMIC TEST APPARATUS

STATEMENT OF GOVERNMENT INTEREST

The invention described herein may be manufactured and used by or for the Government of the United States of America for Governmental purposes without the payment of any royalties thereon or therefor.

CROSS REFERENCES TO RELATED PATENT APPLICATIONS

The instant application is related to my four co-pending U.S. Patent Applications entitled SUPERCONDUCTING ELECTROMAGNETIC TORPEDO LAUNCHER U.S. Pat. No. 5,284,106; SUPERCONDUCTING ELECTROMAGNETIC THRUSTER U.S. Pat. No. 5,333,444; MAGNETOSTRICTIVE BOUNDARY LAYER CONTROL SYSTEM U.S. Pat. No. 5,273,465; and ACTIVE TURBULENCE CONTROL USING MICROELECTRODES, PERMANENT MAGNETS IN MICROGROOVES Ser. No. 08/016,326, filed Feb. 11, 1993 having same filing date.

BACKGROUND OF THE INVENTION (1) Field of the Invention

The present invention generally relates to hydrodynamic test facilities and more particularly to hydrodynamic test facilities using magnetohydrodynamic drive mechanisms.

(2) Description of the Prior Art

Conventional water tunnels using mechanical pumps or propellers to circulate water through the test cell have levels of turbulence in the flow which interfere with test results and have been largely unsuitable for experiments evaluating radiated noise. Generally, any experiment requiring a low-radiated noise environment requires isolation of the water drive unit. Various methods of isolation have been used in conventional test facilities; however, no method has been completely satisfactory in providing low-noise, low-turbulence flow.

SUMMARY OF THE INVENTION

Accordingly, it is an object of the present invention to provide a hydrodynamic test facility suitable for low turbulence and low radiated noise experiments.

It is another object to provide a hydrodynamic test facility having no moving parts in the water flow path.

It is yet another object to provide a hydrodynamic test facility having a water flow powered by a magnetohydrodynamic pump.

Accordingly, the invention is a hydrodynamic test facility using a magnetohydrodynamic (MHD) drive unit to provide the force necessary to circulate water in the test loop section. The test loop is fed by water from a pretreatment section which mixes seawater and tapwater to provide the desired salinity. A post-treatment section neutralizes emitted chlorine gasses.

BRIEF DESCRIPTION OF THE DRAWINGS

FIG. 3 is a schematic view of a test section showing flow lines using conventional pumping; and FIG. 4 is a schematic view of a test section showing flow lines using the magnetohydrodynamic pump.

DESCRIPTION OF THE PREFERRED EMBODIMENT

Figure 1:
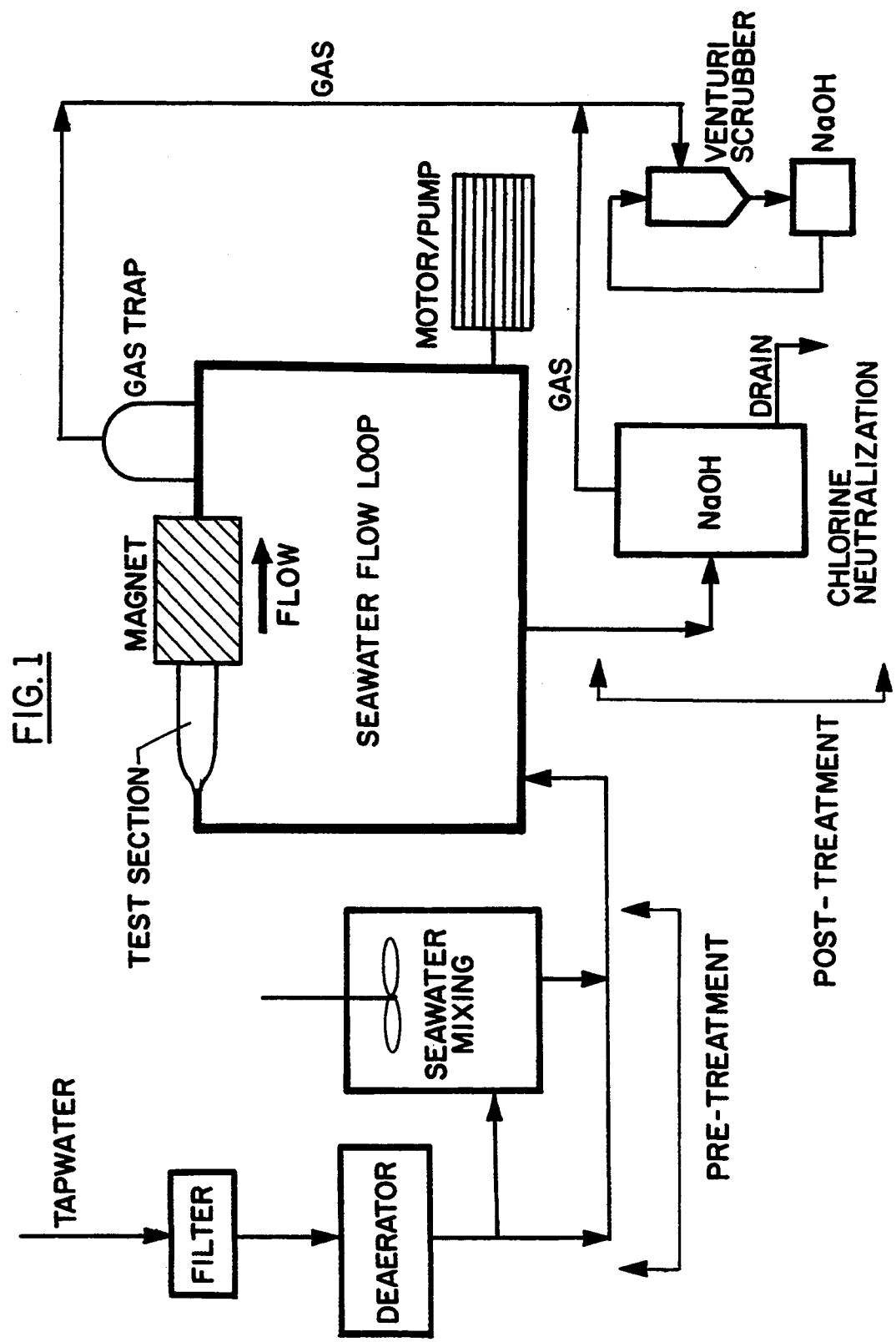
FIG. 1 is a chart showing a diagrammatic representation of the magnetohydrodynamic test facility.

Referring now to FIG. 1, a chart depicts the functional relationship of the various components of the seawater magnetohydrodynamic test facility. For purposes of clarity, this functional chart is divided into three sections, a pretreatment section, a flow loop section, and a post-treatment section, each section having labels.

The pretreatment section provides a source of tapwater which is filtered and passed through a deaerator device. Upon completion of deaeration, the tap water is routed to a seawater mixing tank where the desired level of salinity is achieved by varying the proportions of tapwater and seawater. A bypass of tapwater is also provided to flush the system of seawater when needed.

Pretreated seawater leaving the seawater mixing tank is sent to the seawater flow loop where hydrodynamic testing occurs. Flow in the loop, shown by the labeled arrow, is induced by the magnetohydrodynamic pump unit labeled magnet. Operation of the magnetohydrodynamic pump unit causes chlorine to be evolved from the seawater in the flow loop. A gas trap is provided to draw off generated gasses and direct these gasses to the post-treatment section where neutralization of any evolved chlorine occurs. Neutralization of gaseous chlorine is accomplished by a venturi scrubber assembly and a sodium hydroxide ($N_aOH$) chemical neutralizer.

Additionally, a motor and pump assembly is provided as an auxiliary power source for the flow loop during draining or 4 during tapwater flushing operations. Likewise, a drain is provided through a chlorine neutralization tank.

Figure 2:
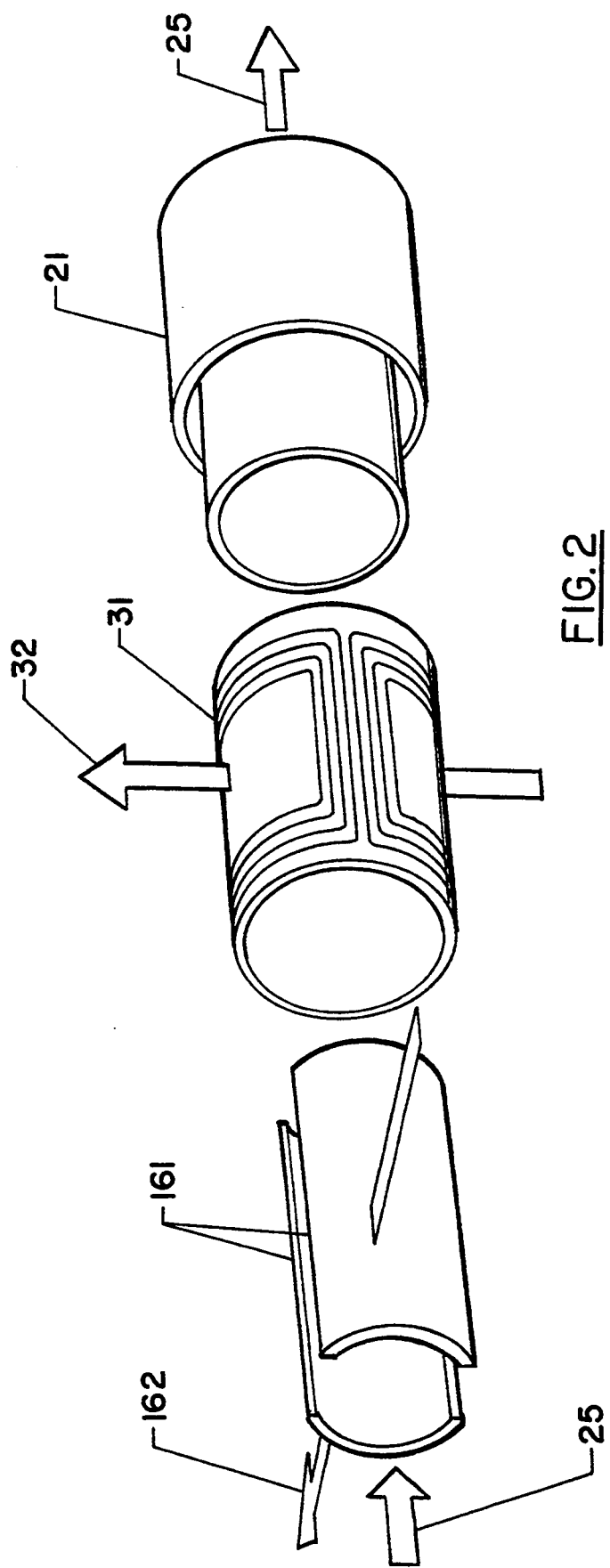
FIG. 2 is an exploded view of the magnetohydrodynamic pump used to drive the seawater flow loop.

Referring now to FIG. 2, the major elements of the magnetohydrodynamic pump are shown using a saddle dipole magnet 8 configuration. Other magnet configurations are possible and invention herein is not intended to be limited to that 10 configuration. For illustration, the components are shown separated axially. Arrows 25 show the direction of seawater 12 flow through the magnetohydrodynamic pump. Electrodes 161 are positioned along the inner wall of the duct flow channel and 14 pass high density current through the seawater. The resulting electric field 162 is shown by the arrow. Enclosed in 16 cryogenic dewar 21 is a superconducting electromagnet 31. An intense magnetic field 32 is produced perpendicular to the 18 electric field 162. The interaction of the magnetic and electric fields produces a Lorentz force acting axially along 20 the duct thereby driving the seawater around the flow loop.

The positioning and design of the hydrodynamic test section shown in FIG. 1 provide for a very low turbulence and 23 ultra-quiet test capability. As is common practice in a conventional test facility, the test section has smooth, low-friction walls and provides for downstream pumping of the flow. In this manner, induced turbulence and noise caused by mechanical action are reduced. Nevertheless, in a conventional test facility the area of undisturbed flow is small. Referring now to FIG. 3, a typical velocity profile for a conventional test facility operating at a typical high Reynolds number is shown. Entering velocity profile 41 has a relatively constant velocity across the diameter of the test section. However, as the flow proceeds downstream, viscous effects caused by flow interaction with the walls cause boundary layer 42 to increase in thickness until the fully developed turbulent flow occurs at point 44. The frictional effects cause the velocity of the flow to slow near the walls and, in order to maintain the flow rate, to accelerate in the center of the tunnel. This uneven velocity is depicted in velocity profile 43. Mechanical pumping device 45 is shown representing the motor-pump device of this invention. Pumping device 45 is used as an alternate pump as needed.

A comparison of the flow patterns in the test section using the magnetohydrodynamic pump 55 may be made by reference of FIG. 4. Velocity profile 51 enters the test section as before with a relatively constant velocity cross-section.

Boundary layer 52 forms; however, the drawing of the flow by the Lorentz force smoothes the flow and reduces the vorticity. Unlike mechanical pumping, no disturbances are introduced into the flow field by the pumping action. In fact, the drawing along the wall by the Lorentz force results in a nearly constant velocity profile 53 at the end of the test section.

The available test area, that is the area having undisturbed flow, extends all the way to point 54 providing a quiet, low turbulence test section.

It will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A seawater magnetohydrodynamic test facility comprising:

means for pretreating a mixture of seawater and tapwater;

a seawater flow loop suitable for hydrodynamic testing receiving the water mixture from said means for pre-treating;

a magnetohydrodynamic pump connected to said seawater flow loop for driving the flow around the said loop; and means for post-treating gasses emitted from said seawater flow loop.

2. A seawater magnetohydrodynamic test facility as in claim 1 wherein said means for pretreating comprises a seawater supply and a tapwater supply and a means for mixing seawater and tapwater.

3. A seawater magnetohydrodynamic test facility as in claim 1 wherein said means for pretreating further comprises filtration for removal of any small debris and deaeration for removal of any entrained air.

4. A seawater magnetohydrodynamic test facility as in claim 1 wherein said seawater flow loop is a closed loop having smooth internal walls suitable for low-turbulence and low-radiated noise testing.

5. A seawater magnetohydrodynamic test facility as in claim 1 wherein said seawater flow loop further comprises a gas trap to remove evolved chlorine and other gasses from the seawater flow.

6. A seawater magnetohydrodynamic test facility as in claim 1 wherein said seawater flow loop further comprises a test section positioned on said loop at a low turbulence location.

7. A test section as in claim 6 wherein said test section location is immediately prior to said magnetohydrodynamic pump.

8. A seawater magnetohydrodynamic test facility as in claim wherein said magnetohydrodynamic pump comprises a superconducting electromagnet in combination with high current seawater electrodes oriented with respect to each other so that a Lorentz force is applied to the seawater in an axial direction along said flow loop.

9. A magnetohydrodynamic pump as in claim 8 wherein said superconducting electromagnet is a saddle dipole magnet.

10. A magnetohydrodynamic pump as in claim 8 further comprising a cryogenic dewar suitable for enclosing said superconducting electromagnet.

11. A seawater magnetohydrodynamic test facility as in claim 1 wherein said means for post-treating comprises a gas trap receiving evolved gasses from said flow loop and a neutralization assembly for removing chlorine gas.

* * * * *